(12) United States Patent
Vivanco

(10) Patent No.: US 12,538,181 B2
(45) Date of Patent: Jan. 27, 2026

(54) OPTIONAL REQUESTING OF SYSTEM INFORMATION DELIVERY IN ADVANCED NETWORKS

(71) Applicant: AT&T Technical Services Company, Inc., Vienna, VA (US)

(72) Inventor: Daniel Vivanco, Ashburn, VA (US)

(73) Assignee: AT&T Technical Services Company, Inc., Vienna, VA (US)

( * ) Notice: Subject to any disclaimer, the term of this patent is extended or adjusted under 35 U.S.C. 154(b) by 477 days.

(21) Appl. No.: 17/932,058

(22) Filed: Sep. 14, 2022

(65) Prior Publication Data
US 2024/0089800 A1    Mar. 14, 2024

(51) Int. Cl.
| H04W 28/24 | (2009.01) |
| H04W 28/18 | (2009.01) |
| H04W 48/12 | (2009.01) |
| H04W 48/14 | (2009.01) |
| H04W 52/02 | (2009.01) |
| H04W 72/30 | (2023.01) |

(52) U.S. Cl.
CPC .......... *H04W 28/24* (2013.01); *H04W 28/18* (2013.01); *H04W 48/12* (2013.01); *H04W 48/14* (2013.01); *H04W 52/0277* (2013.01); *H04W 72/30* (2023.01)

(58) Field of Classification Search
None
See application file for complete search history.

(56) References Cited

U.S. PATENT DOCUMENTS

| 2016/0337931 | A1 | 11/2016 | Wang et al. | |
| 2018/0310235 | A1* | 10/2018 | You | H04W 48/16 |
| 2019/0159110 | A1 | 5/2019 | Takahashi et al. | |
| 2019/0174554 | A1 | 6/2019 | Deenoo et al. | |
| 2019/0246319 | A1* | 8/2019 | Lee | H04W 48/14 |
| 2019/0261421 | A1 | 8/2019 | Peisa et al. | |
| 2019/0313260 | A1 | 10/2019 | Zhang et al. | |
| 2019/0357227 | A1* | 11/2019 | Khirallah | H04L 49/25 |
| 2020/0178253 | A1 | 6/2020 | Gao et al. | |

(Continued)

OTHER PUBLICATIONS

"Notice of Allowance received for U.S. Appl. No. 17/932,150," May 14, 2025, 13 pages.

*Primary Examiner* — Jay L Vogel
(74) *Attorney, Agent, or Firm* — Guntin & Gust, PLC; Erik Boyd

(57) ABSTRACT

The disclosed technology is directed towards improving system usage of a communication network with respect to on-demand system information delivery for certain user equipment devices. When a first user equipment requests on-demand delivery of other system information block data (e.g., SIB2, SIB3, and so on) from a base station, a second device, and possibly other devices, can wait to receive the other system information block data via a broadcast response to the request. Configuration data can indicate that a user equipment device is to operate in the requesting mode or the non-requesting mode. While operating in the non-requesting mode, a device can request the data if not timely received. A device can change modes based on condition data, e.g., QoS of an application, remaining battery power and the like. The disclosed technology can conserve both user equipment resources and network resources.

20 Claims, 10 Drawing Sheets

(56) References Cited

U.S. PATENT DOCUMENTS

| | | | |
|---|---|---|---|
| 2020/0236613 A1* | 7/2020 | Frenger | H04B 7/0617 |
| 2020/0322878 A1* | 10/2020 | Prabhakar | H04W 48/12 |
| 2022/0104094 A1* | 3/2022 | Lei | H04W 48/02 |
| 2022/0104109 A1* | 3/2022 | Lei | H04W 48/14 |
| 2022/0239354 A1* | 7/2022 | Zhao | H04B 7/063 |
| 2022/0377649 A1 | 11/2022 | Choi et al. | |
| 2023/0007621 A1* | 1/2023 | Fu | H04W 48/12 |
| 2024/0089032 A1 | 3/2024 | Vivanco | |
| 2024/0089829 A1 | 3/2024 | Vivanco | |
| 2024/0098679 A1* | 3/2024 | Ghimire | H04W 24/10 |

* cited by examiner

OPTIONAL REQUESTING OF SYSTEM INFORMATION DELIVERY IN ADVANCED NETWORKS

TECHNICAL FIELD

The subject application relates to the delivery of system information to user equipment via advanced networks, e.g., fifth generation networks and beyond.

BACKGROUND

System information (SI) for user equipment is classified into a master information block (MIB) and system information blocks (SIBs). The master information block includes fundamental information needed by user equipment to begin to communicate, including system frame number and system bandwidth data, and is periodically broadcast on the physical broadcast channel (PBCH). System information blocks contain scheduling and cell access information, and are broadcast on the physical downlink shared channel (PDSCH).

In new radio, including fifth generation (5G) networks, the master information block and system information block type1 (SIB1) are defined as minimum SI, while the other system information blocks (SIB2, SIB3, and so on) are defined as other SI. The minimum SI contains the basic information for acquiring the other SI blocks and processing initial access, and is broadcast periodically in a system information window by the base station (a gNodeB (gNb) in 5G). Unlike minimum SI delivery, the other SI contains additional information that can be delivered on demand when needed, referred to in 5G new radio as on-demand SI delivery.

With respect to other SI delivery, network operators configure each base station to either broadcast the other SIB(s) or send them in response to a request from each user equipment device. This is indicated to the user equipment via a si-BroadcastStatus data element in the SIB1 message, set as either si-BroadcastStatus='broadcasting' or si-BroadcastStatus='notbroadcasting'. If not broadcasting the other SI, a user equipment device proceeds with a random access procedure to acquire the other SIB(s), including requesting the other SI, and monitoring the next SI window to receive the other SIB(s), which can be a broadcast or unicast communication. Such a fixed configuration for a base station is not particularly efficient in certain circumstances.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
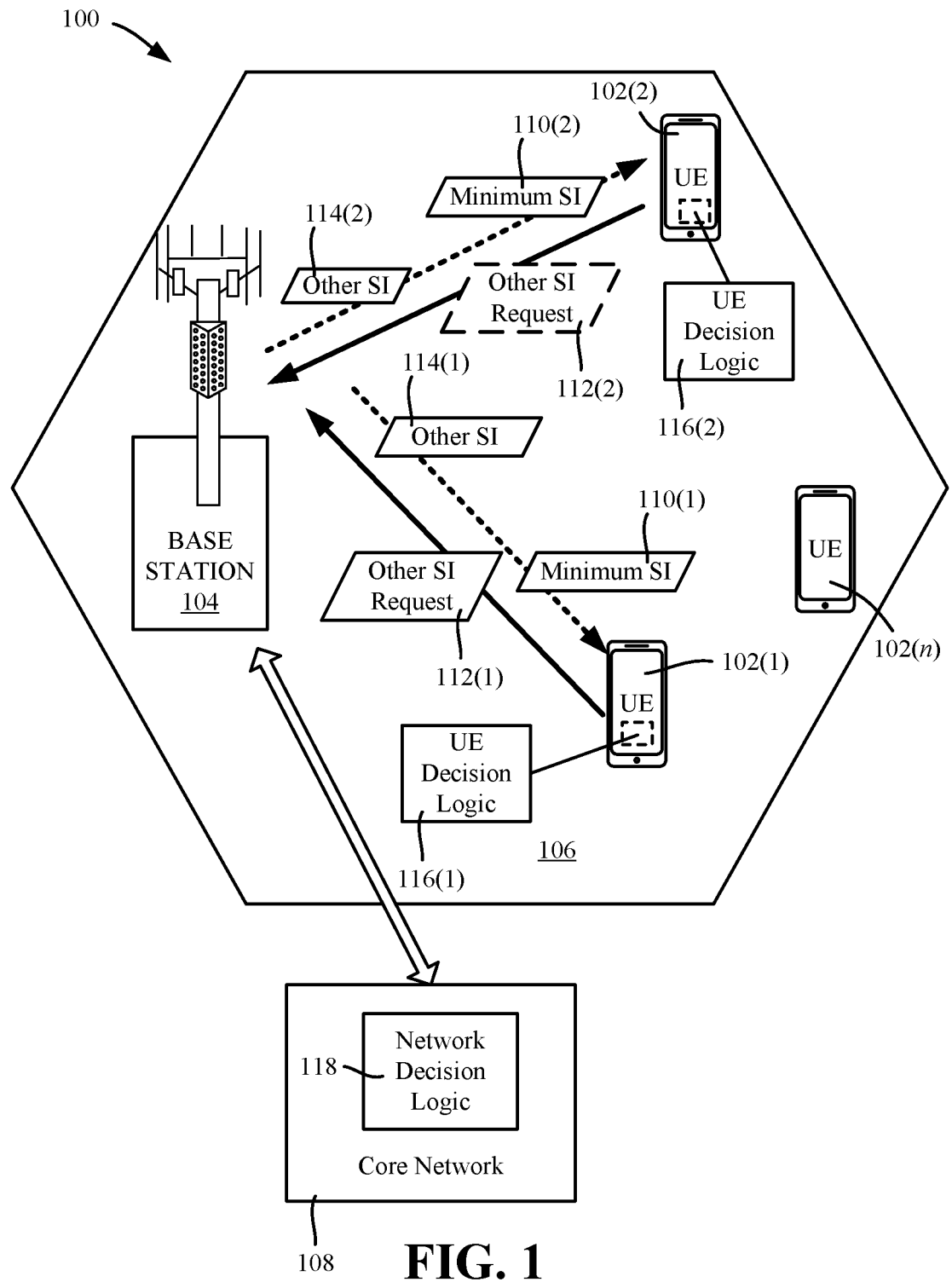
FIG. 1 is a block diagram of an example system in which user equipment device can request other system information block data or wait for the other system information block data from a response to a request from another user equipment device, in accordance with various aspects and embodiments of the subject disclosure.

The technology described herein is generally directed towards improving system usage over fifth generation networks and beyond with respect to on-demand system information delivery for certain user equipment (UE) devices and not others. The technology described herein is based on a user equipment requesting on-demand delivery of other system information block data (e.g., SIB2, SIB3, and so on) from a base station, or waiting to receive the other system information block data until a broadcast communication to another user equipment occurs in response to such an on-demand request from that other user equipment device.

By way of example, via the technology described herein, an ultra-reliable, low latency communications (URLLC) device may request and receive other system information data delivery on-demand, without waiting for another device to make such a request. This results at the expense of larger signaling overhead and UE battery consumption of the requesting device, in exchange for not having to wait for another device, which can be significant to a URLLC device. In contrast, another device such as an Internet-of-Things (IoT) device can save UE battery consumption and reduce signaling overhead by waiting until another device requests the other system information data from the base station, which upon receipt of the request, is communicated by the base station via broadcasting.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth. Olfactory output as well as taste output and/or tactile output can also be part of a promotional presentation as described herein.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows an example system 100 comprising a number of user equipment devices (UEs)/mobile devices 102(1)-102(n) coupled to a base station 104 associated with a cell 106. In turn, the base station 104 is coupled to a core network 108, such as, but not limited to, mobile edge compute (MEC), self-organizing network (SON) and/or a radio access network (RAN) intelligent controller (RIC).

The minimum system information (MIB and SIB1) is periodically broadcast. This is shown in FIG. 1 via blocks 110(1) and 110(2).

When not broadcasting the other system information block data, that is, is sending on demand, only upon receiving a system information request from a UE will the base station deliver the requested other SIB data in the system information window (in a listening/response period), in which the response can be either broadcast or unicast. The base station can utilize beams to sweep over the whole-cell coverage. In one implementation, the base station broadcasts on one beam at a time so that the cell is entirely covered after a full sweeping. The UE request mechanism for on-demand SI can also be designed in different ways; when UEs request the SI through the random access procedure, the request message can be either MSG1-based or MSG3-based.

Figure 2:
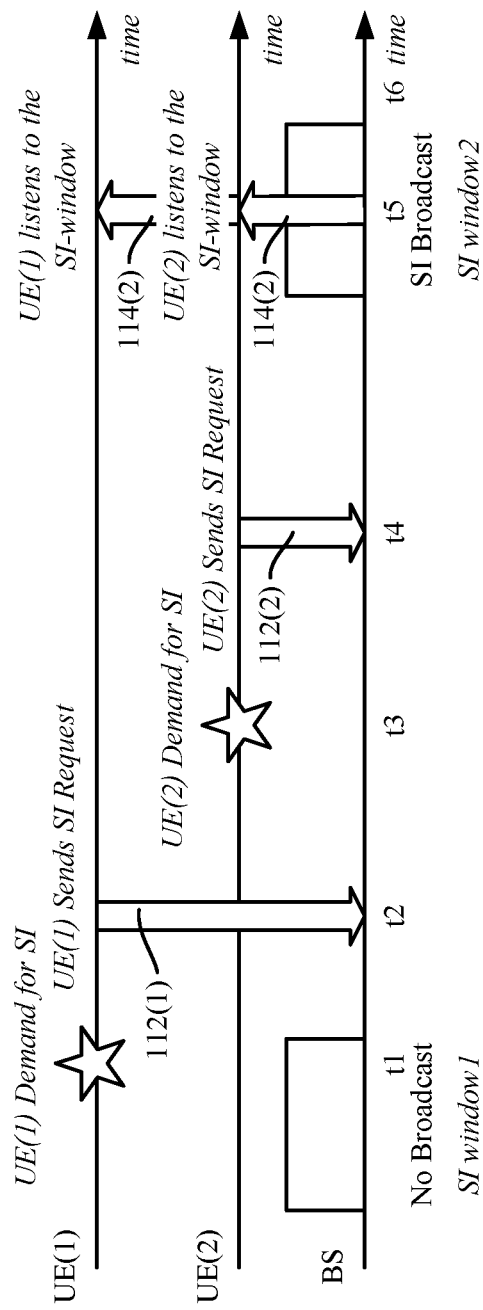
FIG. 2 is an example timing diagram of showing communications when user equipment devices are each configured to request other system information block data, in accordance with various aspects and embodiments of the subject disclosure.
Figure 3:
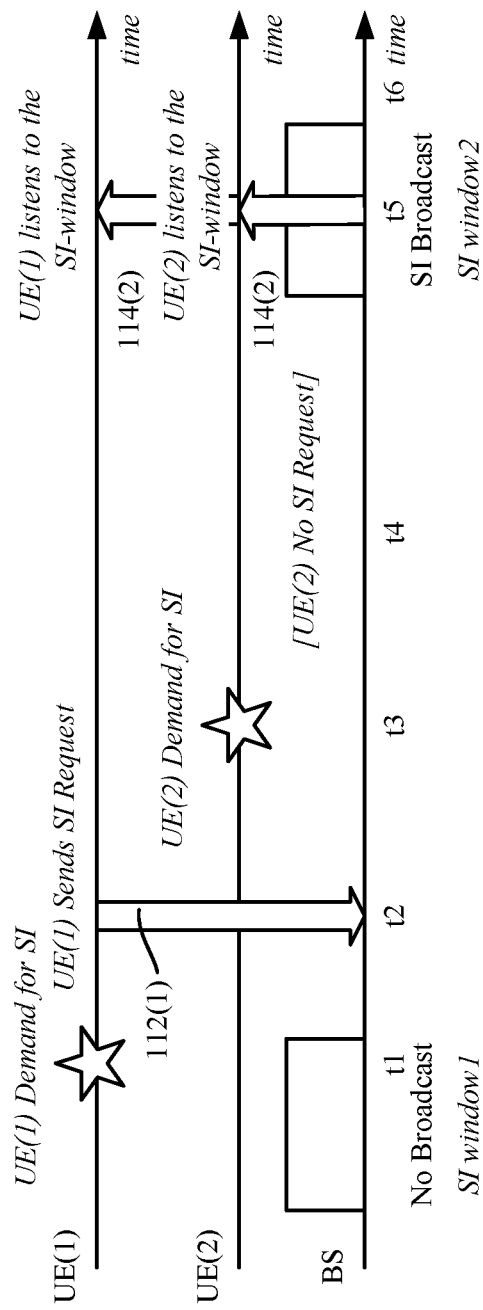
FIG. 3 is an example timing diagram of showing communications when one user equipment device requests other system information block data which is received by the requesting user equipment device and another user equipment device, in accordance with various aspects and embodiments of the subject disclosure.

Following the other system information request 112(1), shown as an arrow in the timing diagram of FIGS. 2 and 3, the UE 102(1) monitors the next SI window to receive the requested other SIB data (the other SI block(s)) from the base station (BS). The on-demand response can be broadcast or unicast to the requesting UE, but is not transmitted unless and until the base station receives the request. A UE such as the UE 102(1) is configured to repeat the request if the response 114(1) is not timely received.

As described herein, the technology facilitates two options, or modes, by which user equipment can receive the other SIB data. This includes a first option in which a user equipment actively makes the request for the other SIB data, and a second option in which a user equipment waits for another UE to make the request for the other SIB data. This is useful when the base station is operating on demand, and broadcasts (rather than unicasts) the other SIB data upon receiving a request.

In the example of FIG. 1, the UE(1) (e.g., UE 112(1) in FIG. 1) has an SI-demand at time "t1" such as after reading the SIB1 from the minimum system information. Based on this demand, the UE(1) sends an SI-request at time "t2". The requested other Si-elements will be broadcast by the base station (BS) during SI-Window2 at time "t.5".

Consider further that the UE(2) (e.g., UE 112(2) in FIG. 1) has an SI-demand at time "t3" in which UE(2) is in the same coverage area as the UE(1). The UE(2) is not aware that the UE(1) has already requested SI-element at time "t2", and also that the UE(2) is not aware that the requested SI-elements will be delivered at time "t5".

As described herein, at the time "t3," the UE(2) has two options, option1 and option2, shown in FIGS. 2 and 3 respectively. With option1, the UE(2) also sends an SI request (optional dashed block 112(2) in FIG. 1 and the arrow labeled 112(2) in FIG. 2), at time "t4", and then listens for the requested other SI message response(s) in the next SI-Window ("t5"). Note that, in the example of FIG. 2, the other SI request by UE2 is not needed, because the UE(1) already sent the SI request at time "t2".

Conversely, with option2, as represented in FIG. 3, the UE(2) does not send a SI request at time "t4", and rather just listens for the requested SI message(s) in the next SI-Window (t5). If the requested SI element(s) are not in the next SI-window (t5), then the UE(2) can send the SI request at some later time, e.g., time "t6" (or possibly even later, expecting at least one other UE to request the other SI-elements at time "t6").

Note that the option1 approach generally assures faster SI delivery for the UE(2) compared to the option2, as well as knowing that the request has been made. Thus, option1 is likely preferable for an ultra-reliable low latency communications (URLLC) device, e.g., configured as option1 at startup, such as for first responder devices. However, the option1 approach can induce larger signaling overhead and UE battery consumption.

In contrast, the option2 approach saves UE(2) battery power and reduces signaling overhead, but may induce a larger delay compared to the option1 approach because of the possibility that the UE(2) may receive the other SI elements without making any request.

Indeed, in the case where several UEs are camped on a given base station (e.g., gNb), and the gNB is configured with SI-BroadcastStatus='notbroadcasting' in SIB1 message, it is possible that one or more UEs may send an SI request at the same time or very close to each other. This also assumes that the gNB will broadcast the SI-elements to the UEs in the next SI-Window after receiving the SI request(s).

Thus, the technology described herein facilitates UEs to select an appropriate SI-request (or not) when a base station is operating with on demand SI-delivery. This can be based on capabilities, conditions and/or requirements of each UE device. The technology can be implemented in logic at the UE, with network counterpart logic, e.g., at a central node global control located on the core network, mobile edge compute (MEC), self-organized network (SON) or RAN intelligent controller (RIC).

As shown in FIG. 1, an instance of UE decision logic 116(1) at the UE 102(1) first reads the SIB1 message to see if SI-BroadcastStatus='notbroadcasting' in SIB1 message, meaning the base station is operating in the on-demand response mode. The logic 116(1) evaluates the UE capabilities, conditions and/or requirements in real time to decide the approach for requesting the other system information block data.

For example, if a UE application program or UE device type has high quality of service (QoS) requirements, a FirstNet® UE that requires fast network connection, the logic 116(1) instructs the UE to use the option1 approach. In this way, the UE 102(1) is assured faster SI delivery.

As another example, if a UE application program or UE device type has low QoS requirements, but high battery consumption constraints, e.g., some IoT devices, then, the logic 116(1) can instruct the UE 102(1) to use the option2 approach. By doing this, the UE 102(1) can be assured to reduce battery consumption, even though SI delivery may be slower.

As yet another example, consider that counterpart logic 118 at the network is aware that a large number of UEs will attempt to connect to the network at the same time at some predefined time(s), e.g., rush hour. Then, the counterpart logic 118 at the network can configure many or most (unless high QoS type) UEs to use the option2 approach during that period of time, because of the higher likelihood that a given UE can benefit from the SI-Request from previous UEs that have already requested the SI-elements. By doing this the counterpart logic 118 will reduce signaling overhead and reduce UE battery consumption, as well as possibly avoid many colliding requests. When, the period of time has expired (e.g., rush hour is over), the counterpart logic 118 and/or the logic instances 116(1) and 116(2) at the UEs to rerun and/or return to their predefined configurations.

Figure 4:
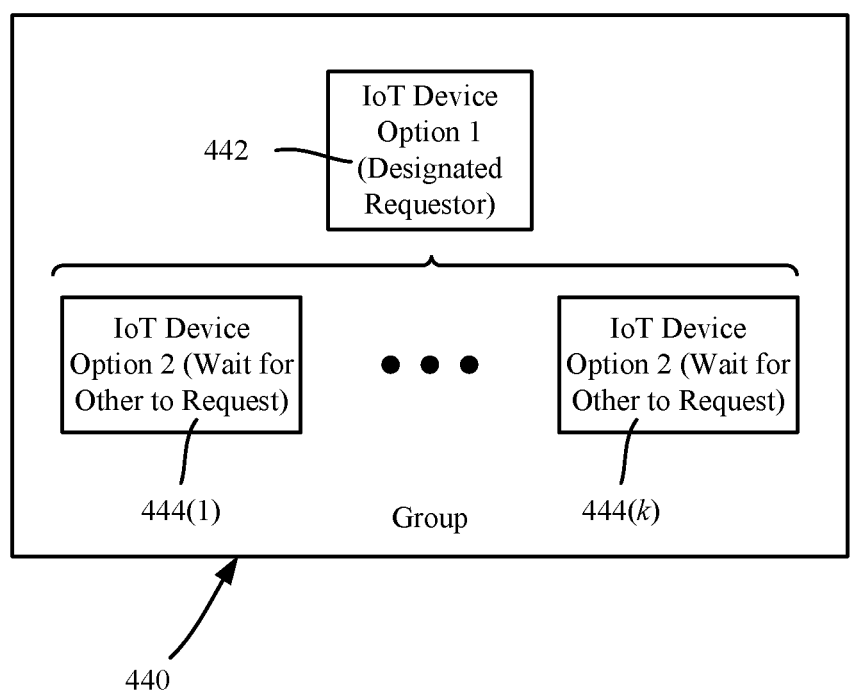
FIG. 4 is a block diagram in which one user equipment device is configured to request other system information block data on behalf of other user equipment devices, in accordance with various aspects and embodiments of the subject disclosure.

Turning to another implementation as generally represented in FIG. 4, consider that a group 440 of related devices such as IoT devices operate together rather than independently, e.g., they wake up at basically the same time and begin to operate to communicate some data before returning to sleep. Rather than have each device request the other system information block data elements (which can cause significant collisions as well as consume battery and significant system overhead), one device 442 is designated to request the other system information block data elements, which the other devices 444(1)-444(k) thus receive. Note that it is feasible for the designated requestor device to indicate in some way, e.g., as part of a modified request, that broadcast of the other system information block data elements, and not unicast, is desired). The designated requestor device can have a separate power source, a larger battery, and so on, or the designated requestor device can be alternated among devices in some way, e.g., random, round-robin and so on to even out battery consumption.

Figure 5:
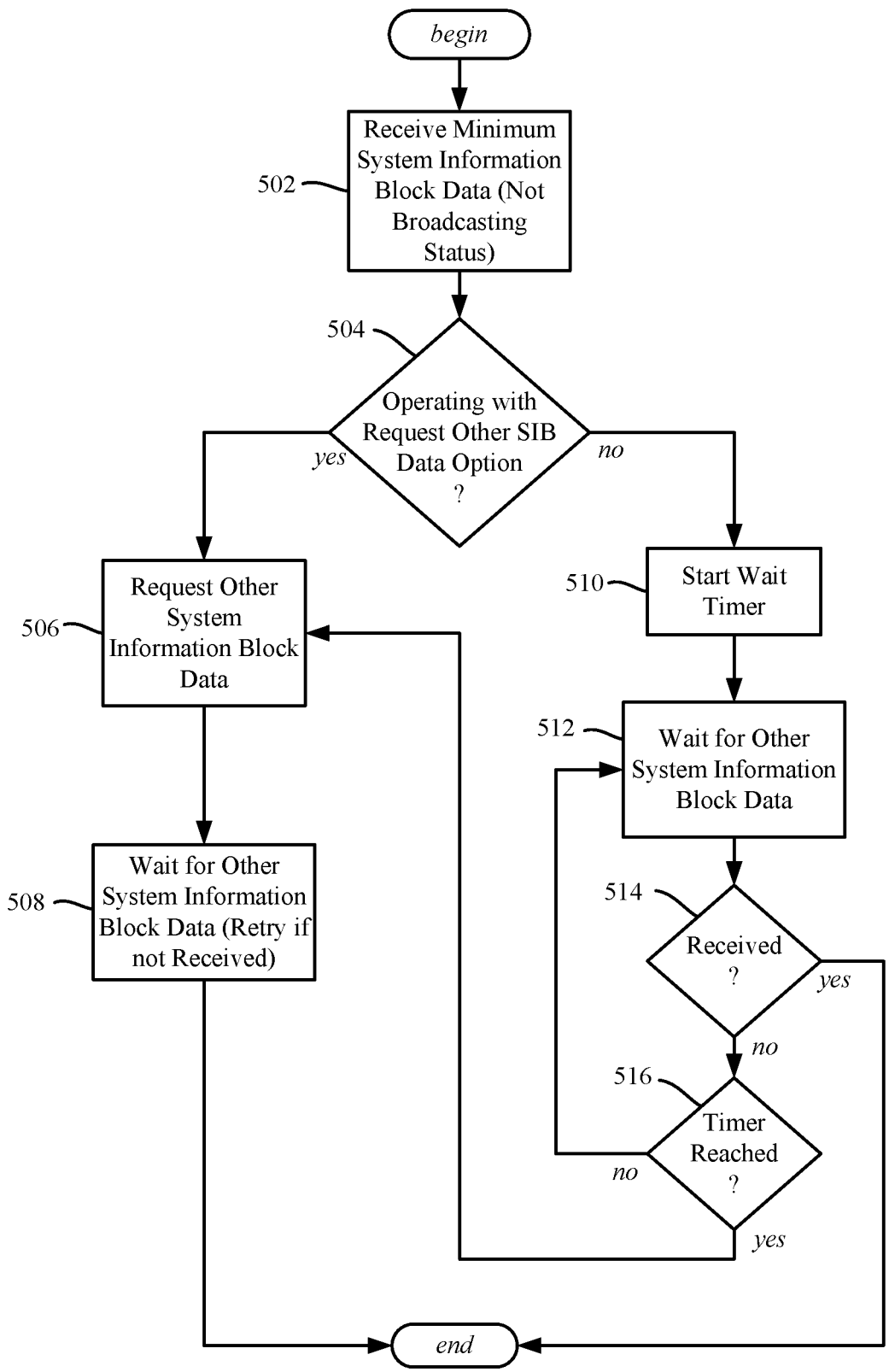
FIG. 5 is a flow diagram representing example operations related to determining whether to request other system information block data or wait for a response to a similar request from another user equipment device, in accordance with various aspects and embodiments of the subject disclosure.

FIG. 5 is a flow diagram showing example operations that can be performed by user equipment, beginning at operation 502 which represents receiving the minimum system information block data. Note that in this example, the minimum system information block data indicates that the base station is operating on demand, that is, the UE logic recognizes that the base station not broadcasting the other system information block data unless requested.

If, as evaluated at operation 504, the user equipment's operating mode is to request the other system information block data, that is option1, operation 506 makes the request. This can be for a URLLC device, for example, based on QoS requirements, battery conditions and so on as set forth herein, or as described with reference to FIG. 4, a device designated to make a request on behalf of other devices. Note that the request or a separate communication can notify the base station to broadcast the other system information block data it the response rather than unicast the data.

Operation 508 represents waiting for the other system information block data. Note that a retry mechanism is already known and built into the logic if not received.

Returning to operation 504, if the user equipment's operating mode is to wait for another device to make the request for the other system information block data, operation 504 branches to operation 510, which starts an optional wait timer; (this need not be the same as the retry wait time), and operation 512 represents the waiting. Note that the wait timer can be an actual clock-based timer, or a counter of system information broadcast windows, e.g., wait up to j system information broadcast windows, possibly just one, before making the request. If the other system information block data is not received at operation 514 before the timer is reached at operation 516, the request is sent via operation 506, otherwise the wait continues. This optional timer prevents waiting for too long for another device to act (which can also be operating in the same mode), such as if in a sparsely populated area or at a time when there are few other devices active in the cell, if any, and so on. Also, the timer is significant if the waiting UE does not receive the other system information block data because it is being unicast to the requesting UE only.

Further, some normally non-requesting devices can be configured to take another action as well as making the request at operation 506. For example, if a device is operating as part of a group as in FIG. 4, and the designated device appears to be not making the request on its behalf, then the non-designated device can send a message to flag the designated device as possibly problematic. In a group, there can be a backup device designated with a shorter wait timer duration (operations 510 and 516) than the rest of the non-designated devices in the group so as to make the request on their behalf, to avoid swamping the base station with concurrent requests (which can collide) upon one device's request not being received/responded to correctly. A group can be configured with staggered wait timer durations, for example.

While a URLLC device is likely to be configured to always request the other system information block data, some devices can be configured to switch between the request/not request mode based on various information, such as likelihood of another device making the request, battery level, and so on. For example, a device with a low battery may wait for another device to make the request, at least for some timeout time. Similarly, a device during a likely busy time (e.g., rush hour) can wait for another device to make the other SIB data request, whereas the same device during a likely non-busy time (e.g., 3:00 am) can make the request right away. The network can configure devices as deemed appropriate, as set forth herein.

Still further, even if operating in the non-requesting mode, the wait timer duration (e.g., operations 510 and 516) can be varied based on conditional data. For example, for a low battery condition of a device, the timer duration can be increased to wait longer than for the same device operating with a more charged battery condition. The timer duration can be set longer during a likely busy time than a likely non-busy time.

Figure 6:
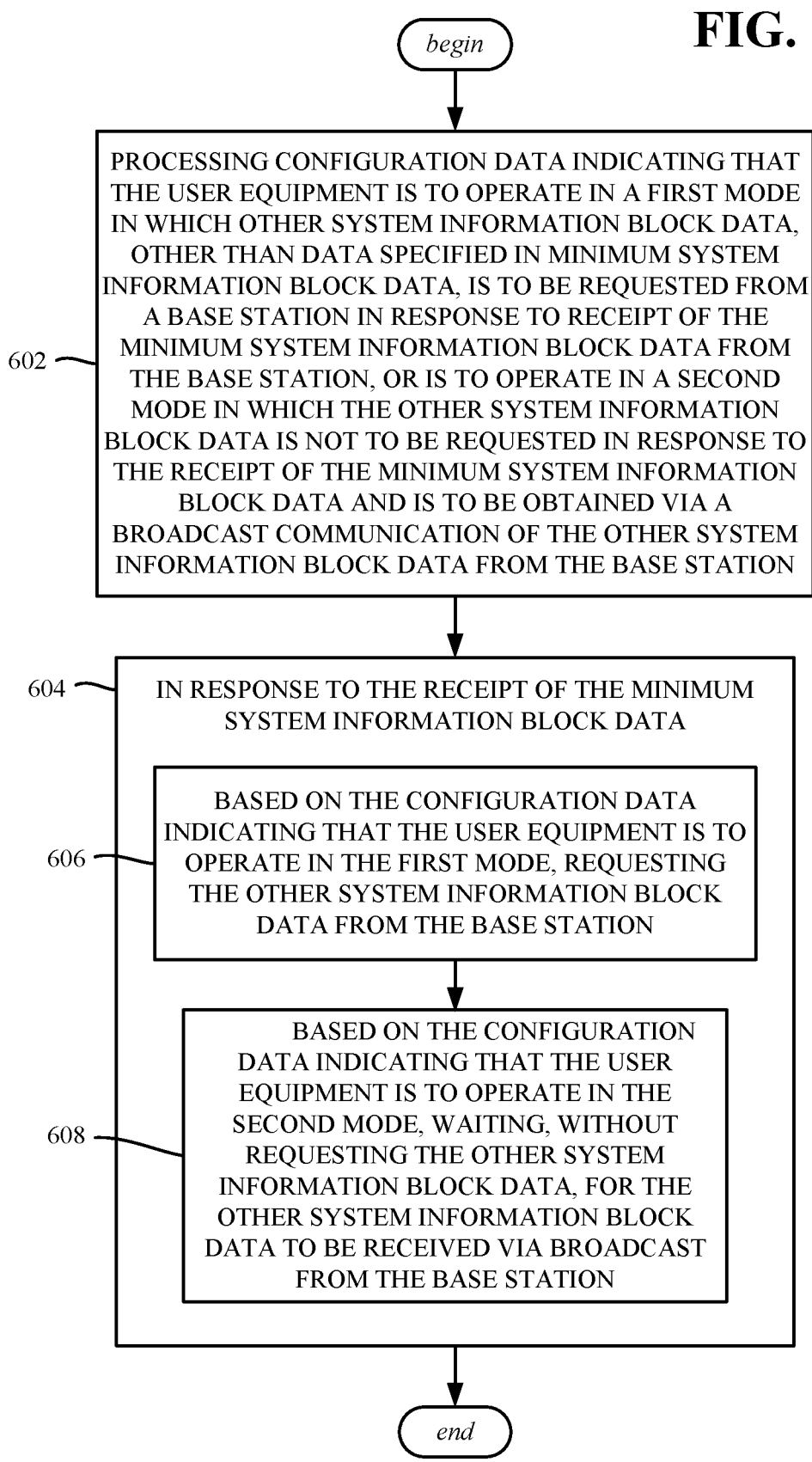
FIG. 6 is a flow diagram representing example operations related to waiting for other system information block data to be received via broadcast of the data, without requesting the other system information block data, in accordance with various aspects and embodiments of the subject disclosure.

One or more example aspects are represented in FIG. 6, and can correspond to a system, including a processor, and a memory that stores executable instructions that, when executed by the processor, facilitate performance of operations. Example operation 602 represents processing configuration data indicating that the user equipment is to operate in a first mode in which other system information block data, other than data specified in minimum system information block data, is to be requested from a base station in response to receipt of the minimum system information block data from the base station, or is to operate in a second mode in which the other system information block data is not to be requested in response to the receipt of the minimum system information block data and is to be obtained via a broadcast communication of the other system information block data from the base station. Example operation 604 represents, in response to the receipt of the minimum system information block data, based on the configuration data indicating that the user equipment is to operate in the first mode, requesting the other system information block data from the base station (example operation 606), and based on the configuration data indicating that the user equipment is to operate in the second mode, waiting, without requesting the other system information block data, for the other system information block data to be received via broadcast from the base station (example operation 608).

The configuration data can be based on decision logic stored at the user equipment.

Further operations can include receiving, by the user equipment, the configuration data from the base station.

Processing the configuration data can be based on a classification of the user equipment. The classification of the user equipment can correspond to an ultra-reliable low latency communications device, and wherein the configuration data indicates that the user equipment is to operate in the first mode. The classification of the user equipment can indicate a device associated with a group of first responder devices, and the configuration data can indicate that the user equipment is to operate in the first mode. The classification of the user equipment can indicate an internet of things device, and the configuration data can indicate that the internet of things device is to operate in the second mode.

The user equipment can be designated to operate in the first mode to request the other system information block data on behalf of a group of user equipment designated to operate in the second mode. For example, the group of user equipment can include a group of internet of things devices.

Waiting for the other system information block data to be received can include listening for the other system information block data to be received for a specified duration; further operations can include, in response to the other system information block data not being received within the specified duration, requesting the other system information block data from the base station.

The configuration data can include first configuration data, the user equipment can be operating in the first mode, and further operations can include receiving second configuration data indicating that the user equipment is to operate in the second mode, and, in response to the receiving of the second configuration data, changing the user equipment to operate in the second mode to await the receipt of the other system information block data from the base station.

Waiting for the other system information block data to be received can be based on a likelihood that the other system information block data has been previously requested by a different user terminal at a previous time, resulting in a likelihood that the other system information block is obtainable via a broadcast communication from the base station at a next system information transmission window.

The configuration data can include first configuration data, the user equipment can be operating in the second mode, the broadcast communication of the other system information block data from the base station can include a first broadcast communication, and further operations can include receiving second configuration data indicating that the user equipment is to operate in the first mode, and, in response to the receiving of second configuration data, changing the user equipment to operate in the first mode, and requesting the other system information block data from the base station in response to receipt of a second broadcast communication of the minimum system information block data from the base station.

Figure 7:
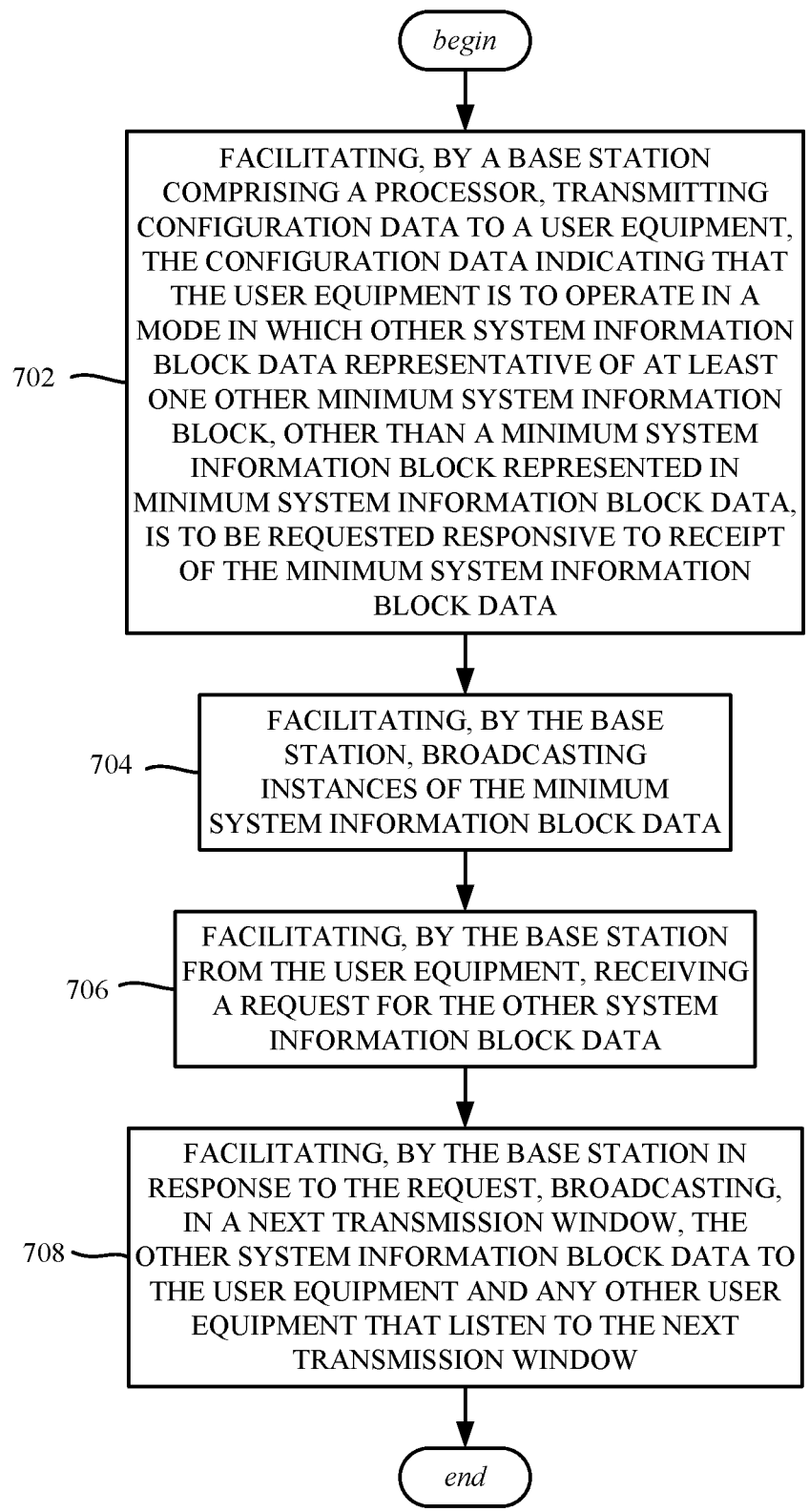
FIG. 7 is a flow diagram representing example operations related to transmitting configuration data to a user equipment to have the user equipment operate in a mode that requests other system information block data, in accordance with various aspects and embodiments of the subject disclosure.

One or more example aspects are represented in FIG. 7, and, for example, can correspond to operations, such as of a method. Example operation 702 represents facilitating, by a base station comprising a processor, transmitting configuration data to a user equipment, the configuration data indicating that the user equipment is to operate in a mode in which other system information block data representative of at least one other minimum system information block, other than a minimum system information block represented in minimum system information block data, is to be requested responsive to receipt of the minimum system information block data. Example operation 704 represents facilitating, by the base station, broadcasting instances of the minimum system information block data. Example operation 706 represents facilitating, by the base station from the user equipment, receiving a request for the other system information block data. Example operation 708 represents facilitating, by the base station in response to the request, transmitting the other system information block data to the user equipment.

The configuration data can include first configuration data, the user equipment can be a first user equipment, and further operations can include facilitating, by the base station, transmitting, to a second user equipment, second configuration data indicating that the second user equipment is to operate in a second mode in which the second user equipment is to await the other system information block data following receipt of an instance of the instances of the minimum system information block data.

The configuration data can include first configuration data, and further operations can include facilitating, by the base station, transmitting, to the user equipment, second configuration data indicating that the user equipment is to change to operate in the second mode in which the user equipment is to await the other system information block data following receipt of an instance of the instances of the minimum system information block data.

Further operations can include facilitating, by the base station, transmitting a message to the user equipment indicating that that user equipment is to process the second configuration data.

Further operations can include, by the base station, obtaining the configuration data from core network equipment coupled to the base station.

Figure 8:
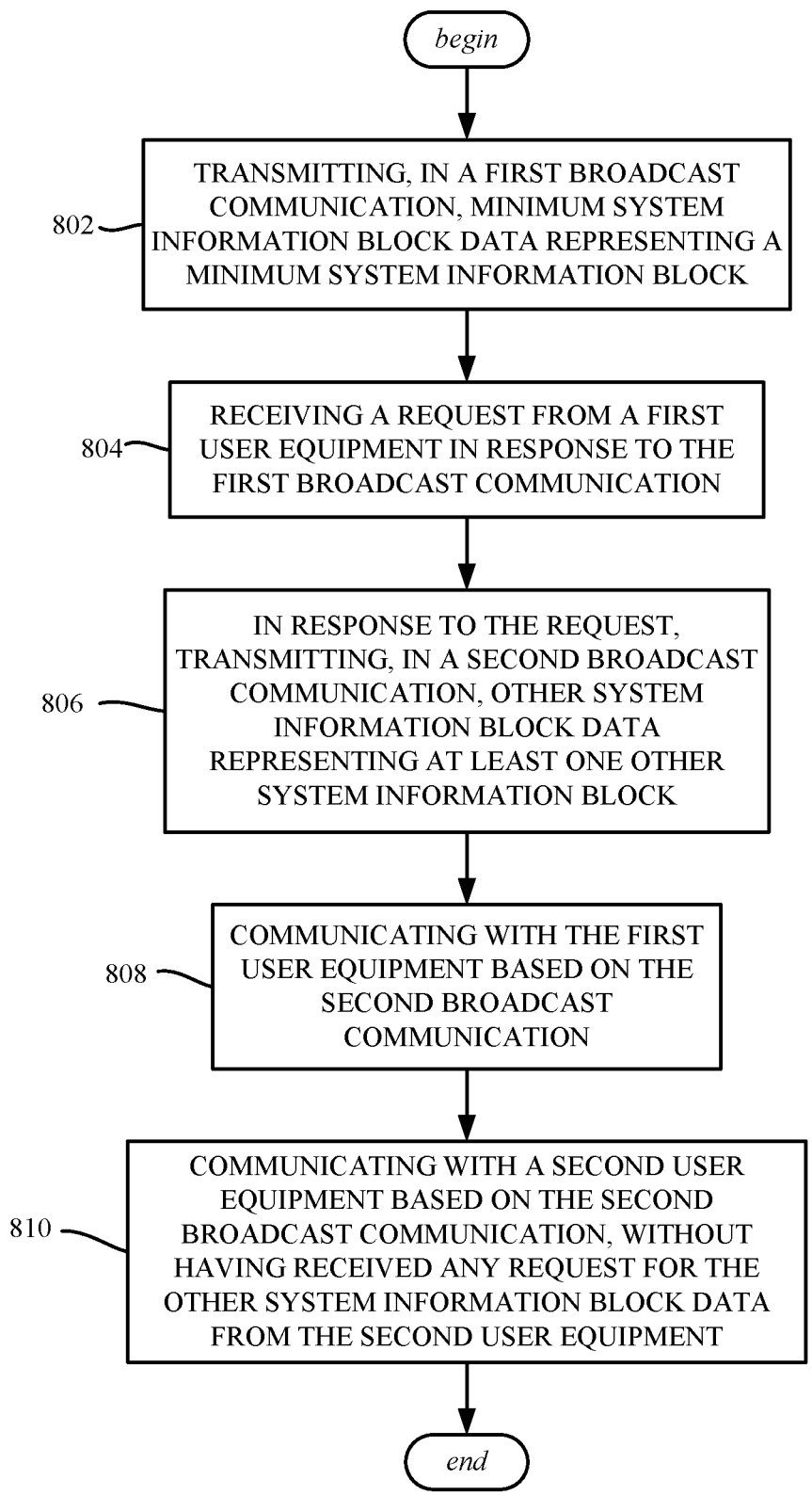
FIG. 8 is a flow diagram representing example operations related to communicating with two user equipment devices based on other system information block data sent in response to a request from only one of the user equipment devices, in accordance with various aspects and embodiments of the subject disclosure.

One or more aspects are represented in FIG. 8, such as implemented in a machine-readable medium, including executable instructions that, when executed by a processor of network equipment, facilitate performance of operations. Example operation 802 represents transmitting, in a first broadcast communication, minimum system information block data representing a minimum system information block. Example operation 804 represents receiving a request from a first user equipment in response to the first broadcast communication. Example operation 806 represents in response to the request, transmitting, in a second broadcast communication, other system information block data representing at least one other system information block. Example operation 808 represents communicating with the first user equipment based on the second broadcast communication. Example operation 810 represents communicating with a second user equipment based on the second broadcast communication, without having received any request for the other system information block data from the second user equipment.

Further operations can include communicating first configuration data to the first user equipment, the first configuration data indicating to the first user equipment to request the minimum system information data, and communicating second configuration to the second equipment device, the second configuration data indicating to the second user equipment to listen for the minimum system information block data for a given period of time.

Further operations can include instructing the first user equipment to change to listen for a future minimum system information block data broadcast without requesting the other system information block data.

As can be seen, the technology described herein facilitates more optimal user equipment and network resource usage by providing a way for a user equipment device to obtain other system information block data without requesting the data. Battery consumption can be reduced on the user equipment device, while signaling overhead is reduced on the network.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 9:
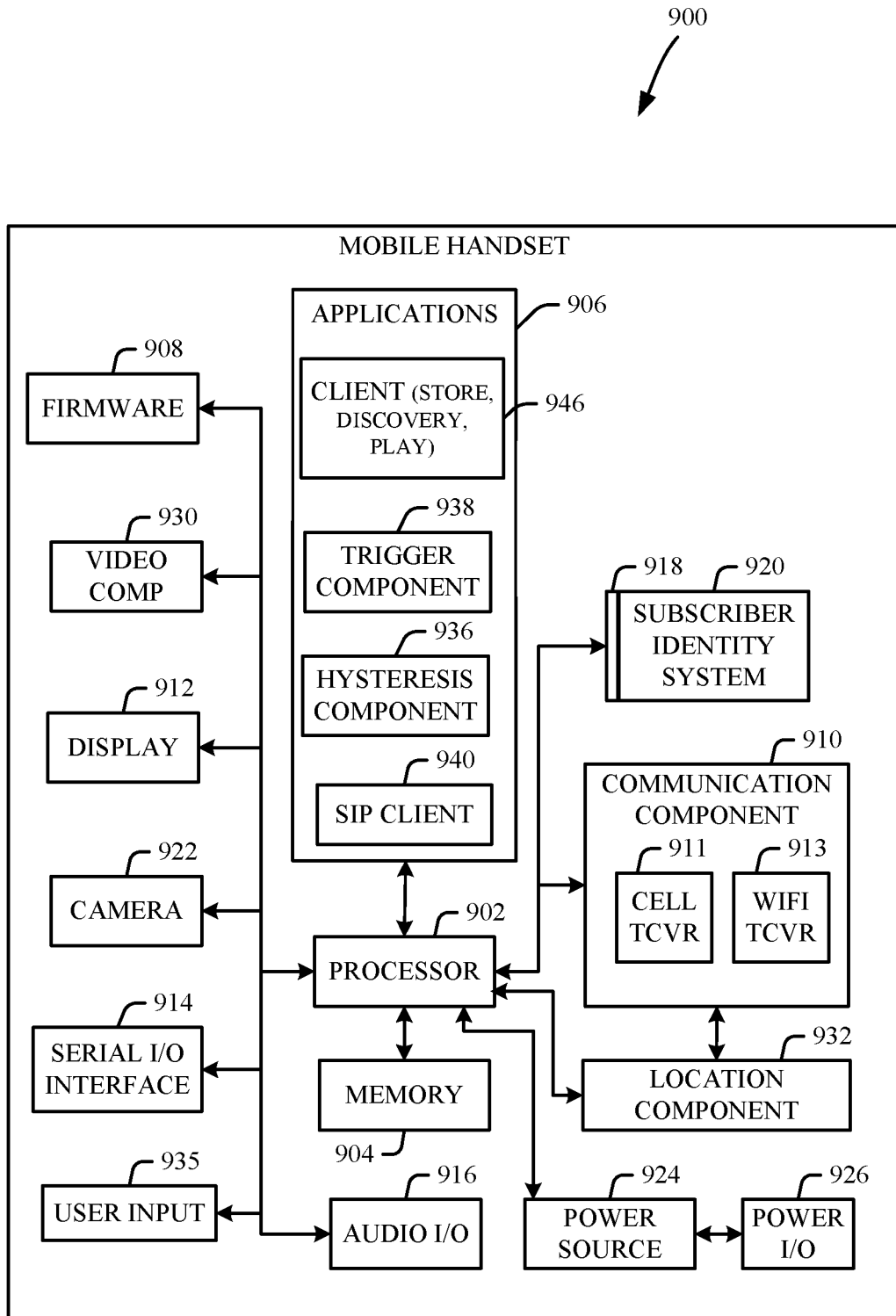
FIG. 9 illustrates an example block diagram of an example mobile handset operable to engage in a system architecture that facilitates wireless communications according to one or more embodiments described herein.

Referring now to FIG. 9, illustrated is a schematic block diagram of an example end-user device (such as user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
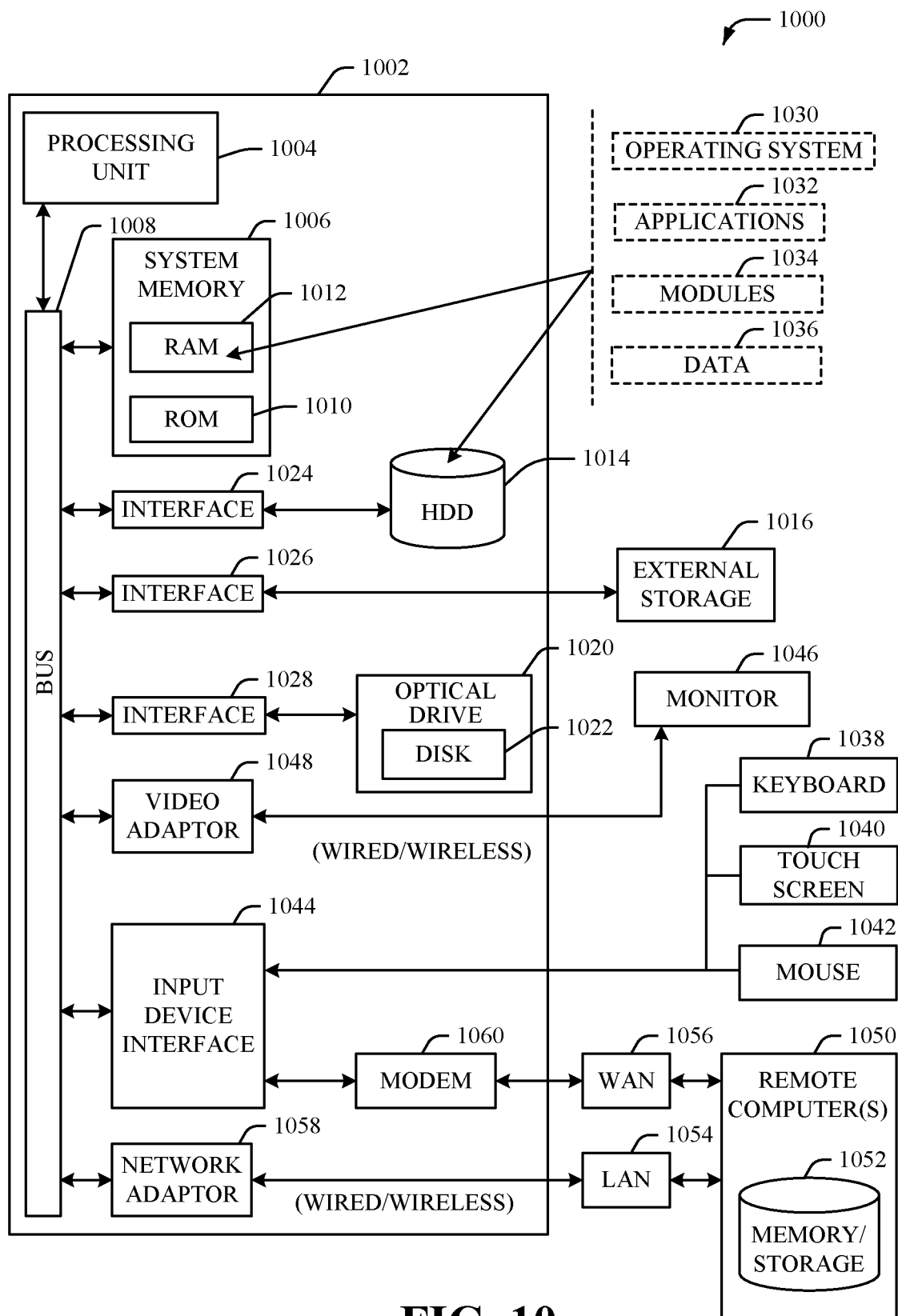
FIG. 10 illustrates an example block diagram of an example computer/machine system operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD), non-volatile memory and other storage technology could be used in addition to, or in place of, an HDD 1014, and can be internal or external. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 994 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A user equipment, comprising:
   a processor; and
   a memory that stores executable instructions that, when executed by the processor, facilitate performance of operations, the operations comprising:
   processing configuration data indicating that the user equipment is to operate in a first mode in which other system information block data, other than data specified in minimum system information block data, is to be requested from a base station in response to receipt of the minimum system information block data from the base station, or is to operate in a second mode in which the other system information block data is not to be requested in response to the receipt of the minimum system information block data and is to be obtained via a broadcast communication of the other system information block data from the base station;
   selecting according to the configuration data and a device specific condition determined by the user equipment, the first mode or the second mode, wherein the device specific condition is based on internal parameters of the user equipment including remaining battery power;
   in response to the receipt of the minimum system information block data,
   based on the device specific condition indicating that the user equipment is to operate in the first mode, requesting the other system information block data from the base station; and
   based on the device specific condition indicating that the user equipment is to operate in the second mode, waiting, without requesting the other system information block data, for the other system information block data to be received via broadcast from the base station.

2. The user equipment of claim 1, wherein the configuration data is based on decision logic stored at the user equipment.

3. The user equipment of claim 2, wherein the operations further comprise switching between the first mode and the second mode in response a change in the internal parameters of the user equipment.

4. The user equipment of claim 1, wherein the device specific condition is further based on a classification of the user equipment, a contextual condition of the user equipment, a quality of service (QOS) requirement of the user equipment, or combinations thereof.

5. The user equipment of claim 4, wherein the classification of the user equipment corresponds to an ultra-reliable low latency communications device, and wherein the configuration data indicates that the user equipment is to operate in the first mode.

6. The user equipment of claim 4, wherein the classification of the user equipment indicates a device associated with a group of first responder devices, and wherein the configuration data indicates that the user equipment is to operate in the first mode.

7. The user equipment of claim 4, wherein the classification of the user equipment indicates an internet of things device, and wherein the configuration data indicates that the internet of things device is to operate in the second mode.

8. The user equipment of claim 1, wherein the user equipment is designated to operate in the first mode to request the other system information block data on behalf of a group of user equipment designated to operate in the second mode.

9. The user equipment of claim 1, wherein the waiting for the other system information block data to be received comprises listening for the other system information block data to be received for a specified duration, and wherein the operations further comprise, in response to the other system information block data not being received within the specified duration, requesting the other system information block data from the base station.

10. The user equipment of claim 1, wherein the waiting for the other system information block data to be received is based on a likelihood that the other system information block data has been previously requested by a different user terminal at a previous time, resulting in a likelihood that the other system information block data is obtainable via a broadcast communication from the base station at a next system information transmission window.

11. The user equipment of claim 1, wherein the configuration data comprises first configuration data, wherein the user equipment is operating in the first mode, and wherein the operations further comprise receiving second configuration data indicating that the user equipment is to operate in the second mode, and, in response to the receiving of the second configuration data, changing the user equipment to operate in the second mode to await the receipt of the other system information block data from the base station.

12. The user equipment of claim 1, wherein the configuration data comprises first configuration data, wherein the user equipment is operating in the second mode, wherein the broadcast communication of the other system information block data from the base station is a first broadcast communication, and wherein the operations further comprise receiving second configuration data indicating that the user equipment is to operate in the first mode, and, in response to the receiving of second configuration data, changing the user equipment to operate in the first mode, and requesting the other system information block data from the base station in response to receipt of a second broadcast communication of the minimum system information block data from the base station.

13. A method, comprising,
receiving, by a user equipment comprising a processor, configuration data from a base station, the configuration data indicating that the user equipment is to operate in a first mode in which other system information block data, other than data specified in minimum system information block data, is to be requested from the base station in response to receipt of the minimum system information block data from the base station, or is to operate in a second mode in which the other system information block data is not to be requested in response to the receipt of the minimum system information block data and is to be obtained via a broadcast communication of the other system information block data from the base station;
receiving, by the user equipment, minimum system information block data from the base station;
selecting, by the user equipment according to the configuration data and a device specific condition determined by the user equipment, the first mode or the second mode, wherein the device specific condition is based on internal parameters of the user equipment including remaining battery power;
in response to the receipt of the minimum system information block data, based on the device specific condition indicating that the user equipment is to operate in the first mode, requesting, by the user equipment, the other system information block data from the base station; and based on the device specific condition indicating that the user equipment is to operate in the second mode, waiting, by the user equipment, without requesting the other system information block data, for the other system information block data to be received via broadcast from the base station.

14. The method of claim 13, wherein the configuration data is first configuration data, wherein the user equipment is a first user equipment, and further comprising receiving, by a second user equipment, second configuration data from the base station, the second configuration data indicating that the second user equipment is to operate in a second mode in which the second user equipment is to await the other system information block data following receipt of an instance of the minimum system information block data.

15. The method of claim 13, wherein the configuration data is first configuration data, and further comprising receiving by the user equipment, second configuration data indicating that the user equipment is to change to operate in a second mode in which the user equipment is to await the other system information block data following receipt of an instance of the instances of the minimum system information block data.

16. The method of claim 15, further comprising receiving, by the user equipment, a message indicating that the user equipment is to process the second configuration data, wherein the message includes information related to the internal parameters of the user equipment.

17. The method of claim 15, further comprising, determining, by the user equipment, internal parameters of the user equipment, and processing configuration data based on the internal parameters.

18. A non-transitory machine-readable medium, comprising executable instructions that, when executed by a processor of user equipment, facilitate performance of operations, the operations comprising:
receiving minimum system information block data representing a minimum system information block from a base station;
processing configuration data indicating that the user equipment is to operate in a first mode in which other system information block data, other than data specified in minimum system information block data, is to be requested from the base station in response to receipt of the minimum system information block data, or is to operate in a second mode in which the other system information block data is not to be requested in response to the receipt of the minimum system information block data and is to be obtained via a broadcast communication of the other system information block data from the base station;
selecting, according to the configuration data and a device specific condition determined by the user equipment, the first mode or the second mode, wherein the device specific condition is based on internal parameters of the user equipment including remaining battery power and a contextual condition;
in response to the receipt of the minimum system information block data, based on the device specific condition indicating that the user equipment is to operate in the first mode, requesting, by the user equipment, the other system information block data from the base station; and based on the device specific condition indicating that the user equipment is to operate in the second mode, waiting, by the user equipment, without requesting the other system information block data, for the other system information block data to be received via broadcast from the base station.

19. The non-transitory machine-readable medium of claim 18, wherein the operations further comprise receiving, by a first user equipment, first configuration data from a base station, the first configuration data indicating to the first user equipment to request the other system information block data, and receiving, by a second user equipment, second configuration data from the base station, the second configuration data indicating to the second user equipment to listen for the other system information block data for a given period of time.

20. The non-transitory machine-readable medium of claim 19, wherein the operations further comprise receiving, by the first user equipment, configuration data from the base station instructing the first user equipment to change to listen for a future minimum system information block data broadcast without requesting the other system information block data.

* * * * *